(12) United States Patent
Arviv et al.

(10) Patent No.: US 7,912,028 B2
(45) Date of Patent: Mar. 22, 2011

(54) REDUCING FALSE DETECTION IN AN HSDPA 3G TERMINAL

(75) Inventors: Eliahou Arviv, Modin (IL); Rafael Carmon, Rishon-Letziyon (IL); Simon Issakov, Bethlehem, PA (US)

(73) Assignee: Agere Systems Inc., Allentown, PA (US)

( * ) Notice: Subject to any disclaimer, the term of this patent is extended or adjusted under 35 U.S.C. 154(b) by 877 days.

(21) Appl. No.: 11/756,152

(22) Filed: May 31, 2007

(65) Prior Publication Data

US 2008/0298334 A1 Dec. 4, 2008

(51) Int. Cl.
*H04B 7/216* (2006.01)
*H04J 3/06* (2006.01)
*H04W 4/00* (2009.01)
*H04W 72/00* (2009.01)

(52) U.S. Cl. ...... 370/342; 370/350; 455/434; 455/452.2

(58) Field of Classification Search .................. 370/342, 370/329, 341, 522, 345, 532, 350; 455/515, 455/452.2, 442, 434
See application file for complete search history.

(56) References Cited

U.S. PATENT DOCUMENTS

| 7,054,288 B2 * | 5/2006 | Sternberg et al. ............. 370/329 |
| 2005/0078648 A1 * | 4/2005 | Nilsson ........................ 370/342 |

* cited by examiner

*Primary Examiner* — Marivelisse Santiago-Cordero
*Assistant Examiner* — Mong-Thuy Tran
(74) *Attorney, Agent, or Firm* — Mendelsohn, Drucker & Associates, P.C.; Kevin M. Drucker; Steve Mendelsohn

(57) ABSTRACT

In one embodiment, a method for determining whether an encoded message in a shared channel is not intended for a communications device. The method includes: (a) decoding the message to recover a multi-bit codeword; (b) determining whether the codeword is valid or invalid, wherein, if the codeword is determined to be invalid, then the encoded message is not intended for the communications device; and (c) if the codeword is determined to be valid, then performing one or more other steps of the method to determine whether the encoded message in the shared channel is not intended for the communications device.

16 Claims, 3 Drawing Sheets

| Code Group Indicator P | | | Code Offset Indicator O | | | | Modulation Scheme Mapping M | Total no. of Valid Combinations |
|---|---|---|---|---|---|---|---|---|
| $X_{1,1}$ $(X_{ccs,1})$ | $X_{1,2}$ $(X_{ccs,1})$ | $X_{1,3}$ $(X_{ccs,1})$ | $X_{1,4}$ $(X_{ccs,1})$ | $X_{1,5}$ $(X_{ccs,1})$ | $X_{1,6}$ $(X_{ccs,1})$ | $X_{1,7}$ $(X_{ccs,1})$ | $X_{1,8}$ $(X_{ccs,1})$ | |
| 0 | 0 | 0 | All except 1111 | | | | 0 or 1 | 30 |
| 0 | 0 | 1 | All except 1111, 1110 | | | | 0 or 1 | 28 |
| 0 | 1 | 0 | All except 1111, 1110, 1101 | | | | 0 or 1 | 26 |
| 0 | 1 | 1 | All except 1111, 1110, 1101, 1100 | | | | 0 or 1 | 24 |
| 1 | 0 | 0 | All except 1111, 1110, 1101, 1100, 1011 | | | | 0 or 1 | 22 |

130 Valid Combinations out of 256

REDUCING FALSE DETECTION IN AN HSDPA 3G TERMINAL

BACKGROUND OF THE INVENTION

1. Field of the Invention

The present invention relates generally to a mobile communications system, and in particular, to transmitting and receiving high-speed shared-control channel (HS-SCCH) information in a mobile communications system supporting a high-speed downlink-packet access (HSDPA) scheme.

2. Description of the Related Art

Code-Division Multiple-Access (CDMA) systems allow many users simultaneously to access a given frequency allocation. User separation at the receiver is possible because each user spreads its respective modulated data waveform over a wide bandwidth using a unique spreading code (also referred to as a "channelization code"), prior to transmitting the waveform. Such spreading typically involves, e.g., multiplying the data waveform with a user-unique high-bandwidth pseudo-noise binary sequence. At the receiving end, the receiver re-multiplies the signal with the pseudo-noise binary sequence to remove substantially all of the pseudo-noise signal, so that the remaining portion of the signal is just the original data waveform. Ordinarily, users spread their signals using codes that are orthogonal to each other, i.e., do not interfere with one another. However, a common problem is inter-symbol interference (ISI), i.e., distortion of a received signal typically manifested in the temporal spreading and consequent overlap of individual pulses from users who are physically proximate to one another to the degree that a receiver cannot reliably distinguish between changes of state representing individual signal elements. ISI can present a significant problem if the power level of the desired signal is significantly lower than the power level of the interfering user (e.g., due to distance) and, at a certain threshold, can compromise the integrity of the received data.

One technique for handling ISI is the use of equalizer-based receivers, which are a promising technology for high-speed data transmission systems, such as systems that conform to the High-Speed Downlink Packet Access (HSDPA) standard, which is part of the Third-Generation Partnership Project ("3GPP," or simply "3G"). Equalizer-based receivers typically use linear channel equalizers to restore the orthogonality of spreading sequences lost in frequency-selective channels (i.e., channels for which the propagation is a strong function of frequency within the bandwidth of the channel), thereby suppressing ISI, such as might occur in a downlink operating under the Wide-Band CDMA (WCDMA) standard (a 3GPP technology). Equalizer-based receivers also have the advantage of being of relatively low complexity for short to moderate signal-delay spreads. In addition to equalizer-based receivers, rake receivers are also used with HSDPA systems.

Due to the fast evolution of the mobile communications market, a major increase in demand for data traffic and high bit-rate services is taking place. To meet this demand, systems are increasing their spectral efficiency (i.e., the amount of information that can be transmitted over a given bandwidth in a specific digital communication system) and are supporting increasingly higher user-data rates, particularly in the downlink direction of the communications path, due to its heavier load relative to the uplink direction.

One technique used in HSDPA for increasing 3G data rates is the use of shared-channel transmission, whereby a certain portion of the channelization codes and transmission power in a cell are considered a common resource that is dynamically-shared among users, primarily in the time domain. Shared-channel transmission makes more efficient use of available code resources than standard WCDMA networks that employ only dedicated channels, which are logical channels allocated to only individual users. The increased efficiency of code and power use can boost cell capacity by more than twice that of a dedicated channel in a standard WCDMA network, thus enabling higher data rates. Shared-channel transmission in HSDPA is accomplished using a High-Speed Downlink Shared Channel (HS-DSCH), which is a downlink data channel for supporting high-speed transmission of downlink packet data, together with its associated control channels. One such control channel is a High-Speed Shared Control Channel (HS-SCCH), which carries downlink information necessary for HS-DSCH demodulation.

Each frame (or data block) transmitted over an HS-SCCH channel has a three-slot duration corresponding to a Transmission Time Interval (TTI) of approximately 2 ms. This frame is divided into two functional parts: The first slot (part 1) carries the time-critical information that is needed to start the demodulation process in time to avoid chip-level buffering, i.e., storing data as chips in a buffer, which typically employs on the order of one thousand times the amount of storage needed to store the original data prior to coding and transmission as symbols, i.e., at the symbol level. The next two slots (part 2) contain less-time-critical parameters, including (i) Cyclic Redundancy Check (CRC) to check the validity of the HS-SCCH information and (ii) process information for Hybrid Automatic-Repeat Request (HARQ), which is an operation designed to reduce the delay and increase the efficiency of re-transmitting data. For protection, both HS-SCCH parts employ terminal-specific scrambling (or "masking") to allow each terminal to decide whether the detected control channel is actually intended for that particular terminal.

In an HSDPA implementation, the Universal Terrestrial Radio-Access Network (UTRAN) allocates a particular number of HS-SCCH channels that corresponds to the maximum number of users that will be code-multiplexed in the network. From the network point of view, there may be a large number of HS-SCCH channels allocated, but each terminal (also referred to as "User Equipment" (UE)) will need to monitor and consider a maximum of only four HS-SCCH channels at a given time. The four channels can be simultaneously intended for up to four different UEs, where a UE cannot have more than one channel intended for it.

A UE has a relatively short duration—e.g., only a single slot—to determine which codes to despread from the HS-DSCH channel. A single UE monitors and considers a maximum of four HS-SCCH channels (i.e., part 1 of the HS-SCCH frame of each channel). If the UE detects a positive indication on one of the four control channels, i.e., that data intended for the UE is being transmitted on that channel, then the UE monitors only that channel in the consecutive TTI, which is done to increase UTRAN signaling reliability. However, part-1 detection is not as reliable as part-2 detection, during which CRC checking is performed. Thus, disadvantageously, false detection of an HS-SCCH channel can occur when part-1 decoding provides a positive indication, and later, the part-2 CRC check fails. Such false detection will not only trigger unnecessary despreading and decoding of the HS-DSCH data channel, but more significantly, will mislead the UE to monitor only one HS-SCCH channel in the next TTI. Accordingly, a high false-detection ratio during HS-SCCH channel decoding can have an impact on throughput performance and require unnecessary physical-layer processing that increases UE power consumption.

Moreover, the false-detection ratio of HS-SCCH part 1 based on Viterbi state metrics is undesirably high, particularly when the received-signal level is good. To reduce false detection of HS-SCCH part 1, a predefined correlation threshold used in the decoding process can be increased. However, increasing the correlation threshold undesirably causes missed detection of data actually intended for the UE when the received-signal level is poor. Therefore, HS-SCCH detection based on Viterbi state metrics alone implies a trade-off between false detection and missed detection.

SUMMARY OF THE INVENTION

Problems in the prior art are addressed in accordance with the principles of the present invention by improving HS-SCCH false-detection ratios. Various embodiments of the present invention address this issue by providing a decoding scheme that (i) reduces the false-detection ratio by identifying only valid combinations of HS-SCCH fields and dropping Viterbi-decoded combinations that are not valid, (ii) provides a mechanism of additional correlation on the received bits to further reduce the false-detection ratio, and (iii) adapts a dynamic correlation threshold as a function of received-signal level.

In one embodiment, a method for determining whether an encoded message in a shared channel is not intended for a communications device. The method includes: (a) decoding the message to recover a multi-bit codeword; (b) determining whether the codeword is valid or invalid, wherein, if the codeword is determined to be invalid, then the encoded message is not intended for the communications device; and (c) if the codeword is determined to be valid, then performing one or more other steps of the method to determine whether the encoded message in the shared channel is not intended for the communications device.

In another embodiment, the present invention provides a communications device adapted to determine whether an encoded message in a shared channel is not intended for the communications device. The communications device includes a decoder adapted to decode the message to recover a multi-bit codeword and a post-decoding block adapted to: (i) determine whether the codeword is valid or invalid, wherein, if the codeword is determined to be invalid, then the encoded message is not intended for the communications device, and (ii) determine whether the encoded message in the shared channel is not intended for the communications device, if the codeword is determined to be valid.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
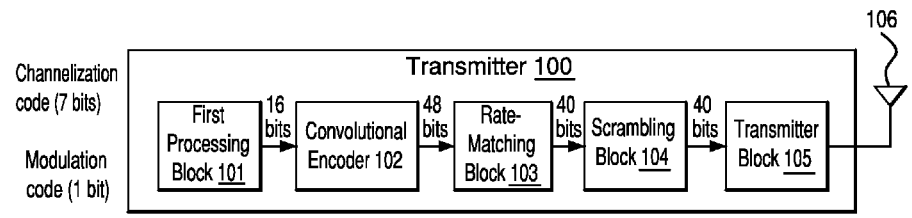
FIG. 1 is a block diagram of an exemplary transmitter for encoding strings of data in an HSDPA communications system in accordance with the 3GPP wireless communications standard.

FIG. 1 illustrates certain portions of an exemplary transmitter 100, as might be integrated into a base station (not shown), for encoding strings of HS-SCCH (part-1 and part-2) data for each of up to four HS-SCCH channels in an HSDPA communications system in accordance with the 3GPP wireless communications standard. As shown, transmitter 100 includes a first processing block 101, a convolutional encoder 102, a rate-matching block 103, a scrambling block 104, a transmitter block 105, and an antenna 106. First processing block 101 is arranged to receive 8 bits of HS-SCCH data consisting of (i) 7 channelization code bits and (ii) a modulation code bit. First processing block 101 appends 8 tail bits to the received information (i.e., channelization and modulation) bits, resulting in a 16-bit codeword. First processing block 101 provides the 16-bit codeword to convolutional encoder 102, which generates a 48-bit codeword that is fed to rate-matching block 103. Rate-matching block 103 punctures the received codeword to produce a 40-bit sequence and passes the 40-bit sequence to scrambling block 104. Scrambling block 104 scrambles (or "masks") the rate-punctured codeword with a UE-specific scrambling sequence for the UE for which the particular HS-SCCH channel is intended and provides the resulting 40-bit codeword to transmitter block 105 for modulation, spreading, and generation of the HS-SCCH channel, which is transmitted as part of a WCDMA signal over an air interface via antenna 106.

Figure 2:
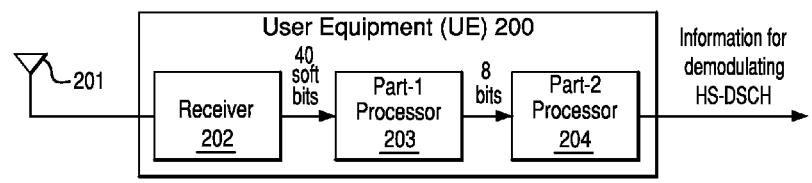
FIG. 2 is a block diagram illustrating exemplary user equipment arranged to operate in accordance with the 3GPP wireless communications standard.

FIG. 2 illustrates certain portions of exemplary user equipment (a "UE") 200, i.e., a wireless communications device, such as a radiotelephone, a PDA, or a laptop computer, arranged to process up to four received HS-SCCH channels in accordance with the 3GPP wireless communications standard. UE 200 includes an antenna 201, a receiver 202, a part-1 processor 203, and a part-2 processor 204. Antenna 201 is coupled to receiver 202, which is arranged to receive, over the air interface in accordance with the 3GPP standard, a WCDMA RF wireless communications signal that includes up to four HS-SCCH channels as provided, e.g., by transmitter 100 of FIG. 1. The four HS-SCCH signals that are recovered by receiver 202 are provided to part-1 processor 203 in the form of 40-bit streams of soft data samples. Part-1 processor 203 is arranged to despread, descramble, demodulate, and decode part 1 of all four streams of data samples to determine whether any of the four HS-SCCH channels appears to be intended for this UE, and if so, to recover the original 8 bits of (channelization and modulation) information processed by transmitter 100 for that channel. Part-2 processor 204 performs scaling and rate-matching of part-2 information, as well as Viterbi decoding and CRC calculation and verification for both part-1 and part-2 information. If the CRC checks for part-1 and part-2 information are successful, then further processing consistent with the HSDPA standard will take place in other components (not shown) of transmitter 100, including despreading and decoding the corresponding HS-DSCH data channel using the recovered HS-SCCH data.

Figure 3:
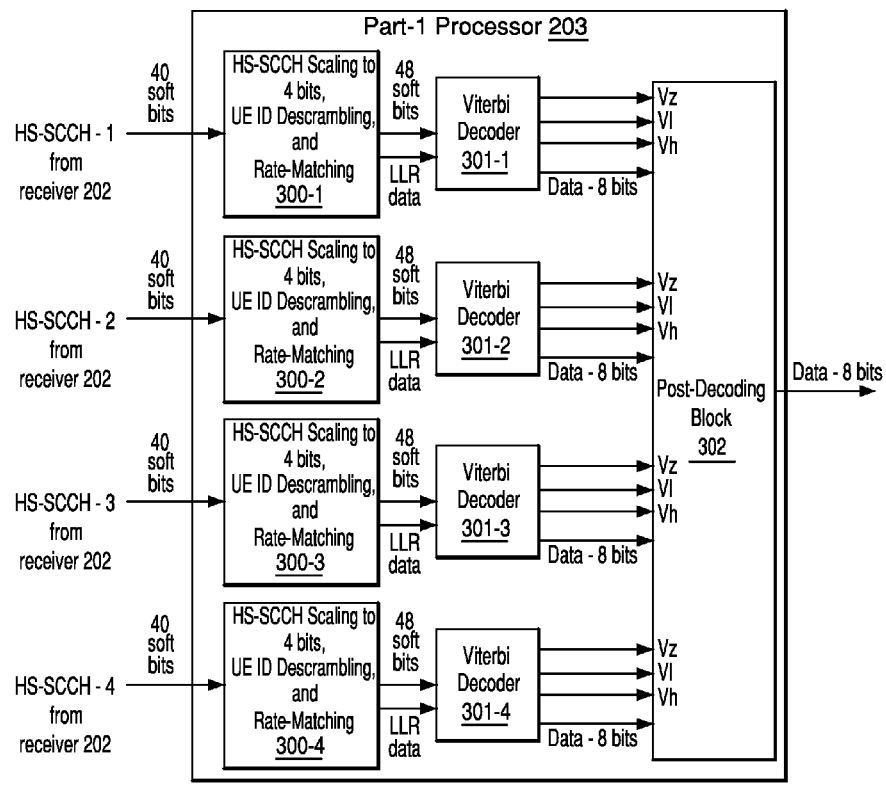
FIG. 3 is a block diagram illustrating the internal components of an exemplary HS-SCCH part-1 processor consistent with one embodiment of the invention.
Figure 4:
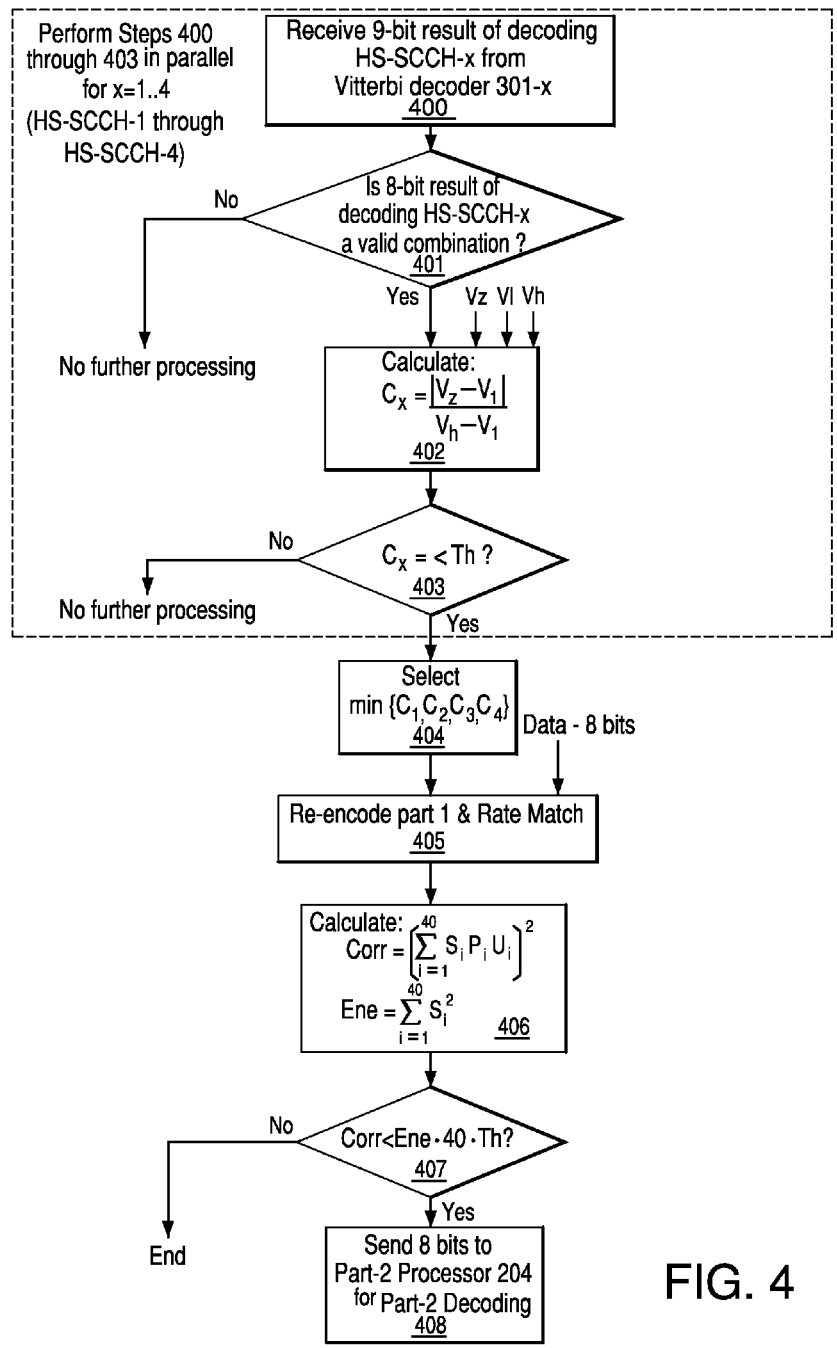
FIG. 4 is a flowchart illustrating an exemplary process flow for the post-decoding block during the processing of one frame.

FIG. 3 illustrates the internal components of exemplary part-1 processor 203 consistent with one embodiment of the invention. As shown, part-1 processor 203 includes, for each of the four HS-SCCH channels recovered by receiver 202, a processing block 300-$x$ that (i) scales the corresponding HS-SCCH-$x$ channel to a four-bit value, (ii) performs UE descrambling, and (iii) performs rate-matching. Part-1 processor 203 further includes, for each of the four HS-SCCH channels, a Viterbi decoder 301-$x$ that generates and outputs (i) reliability information in the form of zero, low, and high state metrics of a trellis map path that was decoded and (ii) 8 soft bits of Viterbi-decoded part-1 data. Additionally, part-1 processor 203 includes a post-decoding block 302, which implements an algorithm as illustrated in FIG. 4, as will be described in further detail below, which outputs 8 bits of data for the channel that appears to be intended for this UE.

In particular, processing blocks 300-$x$ perform scaling for 40 soft bits of part-1 data recovered by receiver 202 for four corresponding HS-SCCH channels in parallel. Each HS-SCCH channel receives 40 soft bits, and since there can be up to 4 HS-SCCH channels, up to 4×40 soft bits per slot are scaled. The scaling for each channel is performed independently of the other channels. Each of the 40 soft bits is represented by a total of 16 bits. Receiver 202 provides up to 4×16×40 bits per slot, which correspond the four channels, i.e., 16×40 bits per HS-SCCH channel. The purpose of the scaling procedure is to calibrate or scale each one of the soft bits from its 16-bit representation to a representation of only 4 bits. To accomplish this in an optimal way, processing block 300-$x$ first calculates, the average power of all 40 soft bits (or "average signal level") using the following equation:

$$S_{av} = \frac{1}{40} \sum_{i=1}^{40} |S_i|,$$

where $S_i$ represents the ith soft bit of the 40-soft-bit data sequence recovered by receiver 202. Next, processing block 300-$x$ calculates the calibration gain using the following equation, where the round function rounds the result to the nearest whole number:

$$\text{Gain} = \text{round}\left(8192 \cdot \frac{21}{S_{av}}\right).$$

The calculation of calibration gain Gain is based on the value of $S_{av}$ and its 16 bits. Gain is the value by which each soft bit is multiplied so that the four most-significant bits of each $S_i$ will be located in the 4 least-significant bits (LSBs) of a 16-bit log-likelihood ratio (LLR) $V_i$, the value of which processing block 300-$x$ calculates using the following equation:

$$V_i = \frac{S_i \cdot \text{Gain}}{2^{15}}.$$

The relevant bits are stored in the 4 LSB bits of $V_i$, and it is only these four LSB bits that will be used as the new $S_i$ bits. Saturation and rounding may then performed using techniques known in the art, and the resulting 4 LSB soft bits of LLR $V_i$ represent a per-bit LLR for the corresponding bit $S_i$ used by Viterbi decoder 301-$x$.

After the scaling operation, processing block 300-$x$ descrambles the scaled bits using the UE-specific scrambling sequence, i.e., the same sequence used by scrambling block 104 of transmitter 100. Following the descrambling operation, processing block 300-$x$ performs rate-matching of the 40-bit part-1 data to a vector of 48 soft bits, which is then provided to a respective Viterbi decoder 301-$x$. This rate-matching is performed to increase the size of the bit-stream by inserting zeros in certain places within the bitstream, in order to match a specified rate at which Viterbi decoder 301-$x$ expects to receive input data. In this scenario, eight zeros are added to each 40-bit vector to produce a 48-bit vector, which is provided to Viterbi decoder 301-$x$.

Viterbi decoder 301-$x$ implements a Viterbi algorithm for convolutional decoding, which is a commonly used algorithm that yields the most likely sequence of bits based on the output values from the channel. The Viterbi algorithm is based on a trellis diagram that is used to perform the decoding process in order to identify the particular path through the trellis that maximizes the probability that the corresponding bit sequence was transmitted, conditioned to the received data samples. The output of the Viterbi algorithm is referred to as a Maximum Likelihood (ML) sequence. A description of the Viterbi algorithm may be found in a standard communications textbook such as J. G. Proakis, *Digital Communications*, 2nd Ed., McGraw Hill, incorporated herein by reference. Viterbi decoder 301-$x$ generates and provides to post-decoding block 302 (i) 8 decoded bits and (ii) three corresponding state metrics: a zero state metric $V_z$, a low state metric $V_l$, and a high state metric $V_h$.

FIG. 4 is a flowchart illustrating an exemplary process flow for post-decoding block 302 during the processing of one frame of HS-SCCH data from each of the four HS-SCCH channels. Steps 400 through 403 are desirably performed in parallel for $x=1.4$ (i.e., HS-SCCH-1 through HS-SCCH-4). If more than one HS-SCCH channel was identified as appearing to be intended for this UE, then steps 404 through 408 performed by post-decoding block 302 select one of these HS-SCCH channels, based on calculated path metric differences that serve as a "tie-breaking" mechanism to select the correct HS-SCCH channel for this UE.

First, at step 400, 8 bits of data decoded from channel HS-SCCH-$x$ are received from Viterbi decoder 301-$x$. At step 401, a determination is made whether the 8-bit result received from Viterbi decoder 301-$x$ is a valid combination, as will be described in further detail below with reference to FIG. 6. If the combination is determined not to be valid, then no further processing is performed for channel HS-SCCH-$x$. If the combination is determined to be valid, then the method proceeds to step 402. At step 402, a correlation value $C_x$ is calculated for the 8-bit combination using the corresponding zero state metric $V_z$, low state metric $V_l$, and high state metric $V_h$, in the following equation:

$$C_x = \frac{|V_z - V_l|}{V_h - V_l}.$$

At step 403, a determination is made whether $C_x$ is less than a given correlation threshold Th. If $C_x$ is determined not to be less than Th, then no further processing is performed for channel HS-SCCH-$x$. If $C_x$ is determined to be less than Th, then the method proceeds to step 404. An appropriate value for threshold Th can be determined adaptively, e.g., as a function of received-signal level. Alternatively, a fixed value for threshold Th can be used, based on prior simulation or real-world execution results.

Prior to step 404, the values of $C_1$ through $C_4$ have been calculated, and these four values $\{C_1, C_2, C_3, C_4\}$ that are less than threshold Th are compared in step 404. At step 404, the minimum $C_x$ is selected from among $\{C_1, C_2, C_3, C_4\}$. In the unlikely but possible event that there are two or more equal minimum values from among $\{C_1, C_2, C_3, C_4\}$, one of those equal minimum $C_x$ values is arbitrarily selected. At step 405, the 8 bits produced by the Viterbi decoder 301-x corresponding to the selected minimum $C_x$ are re-encoded and rate-matched to generate a 40-bit sequence $P_i$ (e.g., using a look-up table of size 130·40 bits). Next, at step 406, energy value Ene (which represents the total energy of the original 40-bit sequence of soft bits recovered by receiver 202) and correlation value Corr. The Ene and Corr parameters are then used together to determine the correlation between the received bits and the re-encoded, rate-matched 40-bit sequence provided in step 405. This correlation is calculated using the following equations:

$$\mathrm{Corr} = \left(\sum_{i=1}^{40} S_i \cdot P_i \cdot U_i\right)^2,$$

$$Ene = \sum_{i=1}^{40} S_i^2,$$

where $S_i$ is ith original soft bit value from receiver 202, $P_i$ is the ith re-encoded bit value of the 40-bit sequence generated in step 405, and $U_i$ is the ith UE scrambler bit value for this UE. At step 407, a determination is made whether Corr is less than Ene·40·Th, where Th is the same threshold used in step 403. If it is determined that Corr is not less than Ene·40·Th, then the part-1 decoding is determined to have failed, no further processing is performed for the current HS-SCCH channel, and it can be concluded that none of the four HS-SCCH channels is intended for the current UE. If it is determined that Corr is less than Ene·40·Th, then part-1 decoding is complete, an HS-SCCH channel that appears to be intended for the current UE has been selected, and processing of the selected HS-SCCH channel then continues at part-2 processor 204 (of FIG. 2). Such part-2 processing includes scaling, rate-matching, and Viterbi-decoding of the next two consecutive slots (which contain part-2 information), and calculation of CRCs for both the part-1 and part-2 information. If the CRCs are successful, then further processing consistent with the HSDPA standard will take place in other components (not shown) of transmitter 100, including despreading and decoding the corresponding HS-DSCH data channel.

Figures 5, 6:
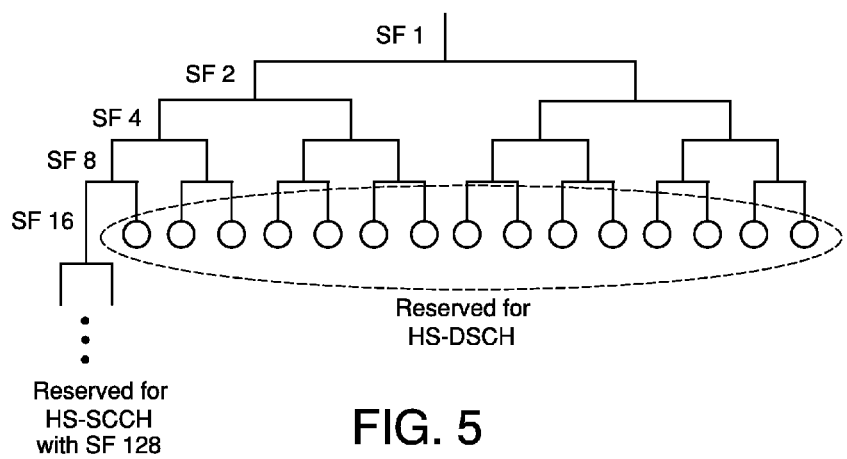
FIG. 5 is an exemplary orthogonal variable spread factor (OVSF) code tree.
FIG. 6 is a table showing all valid bit combinations that could result from Viterbi decoding.

FIG. 5 is an exemplary orthogonal variable spread factor (OVSF) code tree. As shown, for a spread factor of 128, a portion of the 256 total codes are reserved for HS-SCCH encoding and decoding. However, not all of these combinations are actually used in an HSDPA implementation.

The 8 HS-SCCH part-1 bits are mapped to three parameters: (i) modulation-scheme mapping bit $M(x_{ms,1})$, (ii) 3-bit code-group indicator $P(x_{ccs,1}, x_{ccs,2}, x_{ccs,3})$, and (iii) 4-bit code-offset indicator $O(x_{ccs,4}, x_{ccs,5}, x_{ccs,6}, x_{ccs,7})$. Modulation-scheme mapping bit M is used to indicate either a QPSK or a 16-QAM scheme. Code-offset indicator O indicates where the first code is located in the code tree, where all of the remaining codes to assign are located sequentially after the first one. Code-group indicator P indicates how many codes to assign. Thus, P multi-code HS-SCCH channels start at code O in the code tree.

For a spread factor of 16, there are only 16 codes (0.15) in the tree. In this scenario, the pair (P,O)=(3,14) would be invalid because starting at an offset of O=14 permits only two codes to be assigned (i.e., 14 and 15), and there are no codes remaining in the tree to assign for the third code. Thus, if the result of Viterbi decoding is mapped to the pair (P,O)=(3,14), the UE should assume that this HS-SCCH channel is not intended for the UE, so that HS-DSCH decoding is not triggered.

With reference now to FIG. 6, which shows a table of all valid bit combinations that could result from Viterbi decoding, the determination (at step 401 of FIG. 4) of whether the 8-bit result received from Viterbi decoder 301-x is a valid combination will now be described. As shown, all combinations in which the first three bits $x_{1,1}, x_{1,2}, x_{1,3}$ of the 8-bit result are "000" and the subsequent four bits $x_{1,4}, x_{1,5}, x_{1,6}, x_{1,7}$ are not "1111" are valid. All combinations in which the first three bits $x_{1,1}, x_{1,2}, x_{1,3}$ of the 8-bit result are "001" and the subsequent four bits $x_{1,4}, x_{1,5}, x_{1,6}, x_{1,7}$ are not "1111" or "1110" are valid, and so forth. As the table shows, there are only 130 valid combinations out of 256 possible 8-bit combinations, i.e., nearly half of the combinations are not used in 3.6 Mbps HSDPA. (It is noted that these 130 valid combinations correspond to the 130×4-bit table size of the look-up table mentioned above, which is used to generate the 40-bit sequence $P_i$. For each valid combination, there are 40 bits in the table.) By using this knowledge as an additional level of filtering as part of HS-SCCH part-1 decoding, false detection can be significantly reduced.

Two additional filters for the reliability of the decoded 8-bit combinations can be used in certain embodiments of the invention, as already described above with reference to FIG. 4.

The first filter is the comparison of the Viterbi state-metric ratio $C_x$ to a given threshold Th, e.g., as in step 403 of FIG. 4.

The second filter (an example of which is step 407 of FIG. 4) is the use of an adaptive correlation threshold Th to compare (i) the original 40 soft bits in part-1 HS-SCCH decoding with (ii) the 40 re-encoded and rate-matched bits generated in step 405 of FIG. 4. Setting adaptive correlation thresholds as a function of received-signal level (e.g., using a relatively higher threshold value for a good signal level and a relatively lower threshold value for a poor signal level) further lowers both the false-detection ratio and the missed-detection ratio.

It should be understood that, although the present invention is described herein in the context of HS-SCCH decoding in an HSDPA system, the invention may have applicability for decoding other data types and may have utility in other WCDMA systems as well. While Viterbi decoding is described herein as being used for decoding and producing state metrics, other convolutional decoders and algorithms, such as the Yamamoto-Itoh (YI) algorithm, may be used in certain embodiments of the present invention.

Although receiver 202, part-1 processor 203, and part-2 processor 204 are shown as separate components, two or more of these components, in some embodiments, could be combined to form a single component. Alternatively, any one of these components could be divided into two or more components, and even rearranged. Such combination, division, and rearrangement are also possible for other logical and structural components depicted and described herein, in a device and/or system consistent with various embodiments of the present invention.

While a number of the operations set forth herein are described as being performed in parallel for HS-SCCH-1 through HS-SCCH-4, e.g., steps 400 through 403 of FIG. 4, such operations do not necessarily have to be performed in parallel. Similarly, although four sets of blocks 300-1 through 300-4 and Viterbi decoders 301-1 through 301-4 are used in the embodiments described above, it is possible that such operations could alternatively be time-multiplexed for two or more of HS-SCCH channels 1 through 4 using fewer than the corresponding number of blocks 300-x and/or fewer than the corresponding number of Viterbi decoders 301-x. Moreover, although four HS-SCCH channels are substantially concurrently processed in the embodiments described and illustrated herein, other numbers of HS-SCCH channels could be processed in alternative embodiments.

It should be understood that the present invention is not limited to decoding of data transmitted on HS-SCCH channels in an HSDPA system, and that the invention may have applicability to the decoding of data on other channels and in non-HSDPA systems. Although the embodiments described herein are in a wireless communications system, other embodiments of the invention may have applicability in non-wireless communication systems.

The present invention may also be used with rake receivers and other types of receivers and is not limited to equalizer-based receivers.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It should be understood that the steps of the exemplary methods set forth herein are not necessarily required to be performed in the order described, and the order of the steps of such methods should be understood to be merely exemplary. For example, although step 401 of FIG. 4 is shown as taking place between steps 400 and 402, it is possible that step 401 could be performed at other stages of HS-SCCH processing, in alternative embodiments of the present invention. Additionally, step 403 could be performed after step 404 in alternative embodiments. Likewise, additional steps may be included in such methods, and certain steps may be omitted or combined, in methods consistent with various embodiments of the present invention.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method for determining whether an encoded message in a shared channel is not intended for a communications device, the method comprising:
  (a) decoding the message to recover a multi-bit codeword;
  (b) determining whether the codeword is valid or invalid, wherein, if the codeword is determined to be invalid, then the encoded message is not intended for the communications device; and
  (c) if the codeword is determined to be valid, then performing one or more other steps of the method to determine whether the encoded message in the shared channel is not intended for the communications device, wherein:
  steps (a) and (b) are performed in parallel for a plurality of shared channels;
  the one or more other steps comprise:
    at least one single-channel step performed in parallel for each of the plurality of shared channels; and
    at least one multi-channel step performed for the plurality of shared channels;
  the at least one single-channel step comprises:
    (1) generating a correlation value for the codeword; and
    (2) comparing the correlation value to a threshold to determine whether the message is not intended for the communications device; and
  the at least one multi-channel step comprises:
    (1) selecting a shared channel having a minimum correlation value from the plurality of shared channels;
    (2) re-encoding and rate-matching the codeword for the selected shared channel to generate an encoded, rate-matched codeword;
    (3) calculating a re-encoded correlation value between the message and the encoded, rate-matched codeword; and
    (4) thresholding the calculated re-encoded correlation value to determine whether the message is not intended for the communications device; and
  the re-encoded correlation value is determined using the equation $$\mathrm{Corr} = \left( \sum_{i=1}^{40} S_i \cdot P_i \cdot U_i \right)^2,$$

wherein:
S$_i$ is a soft bit value, P$_i$ is a re-encoded bit value, and U$_i$ is a UE scrambler bit value; and
the correlation value is compared to a threshold by comparing Corr to Ene.40.Th,
wherein Th is a correlation threshold, and $$Ene = \sum_{i=1}^{40} S_i^2.$$

2. The invention of claim 1, wherein the shared channel is a High-Speed Shared Control Channel (HS-SCCH).

3. The invention of claim 1, wherein:
the message comprises a first part and a second part;
the codeword is encoded in the first part;
if the method does not determine that the message is not intended for the communications device, then the second part of the message is decoded.

4. The invention of claim 3, wherein the second part of the message encodes data for demodulating another shared channel.

5. A method for determining whether an encoded message in a shared channel is not intended for a communications device, the method comprising:
(a) decoding the message to recover a multi-bit codeword;
(b) determining whether the codeword is valid or invalid, wherein, if the codeword is determined to be invalid, then the encoded message is not intended for the communications device; and
(c) if the codeword is determined to be valid, then performing one or more other steps of the method to determine whether the encoded message in the shared channel is not intended for the communications device, wherein:
steps (a) and (b) are performed in parallel for a plurality of shared channels;
the one or more other steps comprise:
at least one single-channel step performed in parallel for each of the plurality of shared channels; and
at least one multi-channel step performed for the plurality of shared channels;
the at least one single-channel step comprises:
(1) generating a correlation value for the codeword; and
(2) comparing the correlation value to a threshold to determine whether the message is not intended for the communications device; and
the at least one multi-channel step comprises:
(1) selecting a shared channel having a minimum correlation value from the plurality of shared channels;
(2) re-encoding and rate-matching the codeword for the selected shared channel to generate an encoded, rate-matched codeword;
(3) calculating a re-encoded correlation value between the message and the encoded, rate-matched codeword; and
(4) thresholding the calculated re-encoded correlation value to determine whether the message is not intended for the communications device; and
the correlation value C$_x$ is calculated by the equation $$C_x = \frac{|V_z - V_l|}{V_h - V_l},$$

wherein V$_z$ represents a zero state metric, V$_l$ represents a low state metric, and V$_h$ represents a high state metric.

6. The invention of claim 5, wherein the shared channel is a High-Speed Shared Control Channel (HS-SCCH).

7. The invention of claim 5, wherein:
the message comprises a first part and a second part;
the codeword is encoded in the first part;
if the method does not determine that the message is not intended for the communications device, then the second part of the message is decoded.

8. The invention of claim 7, wherein the second part of the message encodes data for demodulating another shared channel.

9. A communications device adapted to determine whether an encoded message in a shared channel is not intended for the communications device, the communications device comprising:
one or more processors including:
a decoder adapted to decode the message to recover a multi-bit codeword;
a post-decoding block adapted to:
(i) determine whether the codeword is valid or invalid, wherein, if the codeword is determined to be invalid, then the encoded message is not intended for the communications device, and
(ii) determine whether the encoded message in the shared channel is not intended for the communications device, if the codeword is determined to be valid, wherein:
the post-decoding block is adapted to determine in parallel, for a plurality of shared channels, whether the codeword is valid or invalid;
the post-decoding block is adapted, if the codeword is determined to be valid, to:
(i) perform at least one single-channel function in parallel for each of the plurality of shared channels, and
(ii) perform at least one multi-channel function for the plurality of shared channels;
the at least one single-channel function comprises:
(1) generating a correlation value for the codeword; and
(2) comparing the correlation value to a threshold to determine whether the message is not intended for the communications device; and
the at least one multi-channel function comprises:
(1) selecting a shared channel having a minimum correlation value from the plurality of shared channels;
(2) re-encoding and rate-matching the codeword for the selected shared channel to generate an encoded, rate-matched codeword;
(3) calculating a re-encoded correlation value between the message and the encoded, rate-matched codeword; and
(4) thresholding the calculated re-encoded correlation value to determine whether the message is not intended for the communications device;
the re-encoded correlation value is determined using the equation $$Corr = \left(\sum_{i=1}^{40} S_i \cdot P_i \cdot U_i\right)^2,$$

wherein:

$S_i$ is a soft bit value, $P_i$ is a re-encoded bit value, and $U_i$ is a UE scrambler bit value; and the correlation value is compared to a threshold by comparing Corr to Ene·40·Th, wherein Th is a correlation threshold, and $$Ene = \sum_{i=1}^{40} S_i^2.$$

10. The invention of claim 9, wherein the shared channel is a High-Speed Shared Control Channel (HS-SCCH).

11. The invention of claim 9, wherein:

the message comprises a first part and a second part;

the codeword is encoded in the first part;

if the post-decoding block does not determine that the message is not intended for the communications device, then the second part of the message is decoded.

12. The invention of claim 11, wherein the second part of the message encodes data for demodulating another shared channel.

13. A communications device adapted to determine whether an encoded message in a shared channel is not intended for the communications device, the communications device comprising:

one or more processors including:
  a decoder adapted to decode the message to recover a multi-bit codeword;
  a post-decoding block adapted to:
    (i) determine whether the codeword is valid or invalid, wherein, if the codeword is determined to be invalid, then the encoded message is not intended for the communications device, and
    (ii) determine whether the encoded message in the shared channel is not intended for the communications device, if the codeword is determined to be valid, wherein:
      the post-decoding block is adapted to determine in parallel, for a plurality of shared channels, whether the codeword is valid or invalid;
      the post-decoding block is adapted, if the codeword is determined to be valid, to:
        (i) perform at least one single-channel function in parallel for each of the plurality of shared channels, and
        (ii) perform at least one multi-channel function for the plurality of shared channels;
    the at least one single-channel function comprises:
      (1) generating a correlation value for the codeword; and
      (2) comparing the correlation value to a threshold to determine whether the message is not intended for the communications device; and
    the at least one multi-channel function comprises:
      (1) selecting a shared channel having a minimum correlation value from the plurality of shared channels;
      (2) re-encoding and rate-matching the codeword for the selected shared channel to generate an encoded, rate-matched codeword;
      (3) calculating a re-encoded correlation value between the message and the encoded, rate-matched codeword; and
      (4) thresholding the calculated re-encoded correlation value to determine whether the message is not intended for the communications device; and
  the correlation value $C_x$ is calculated by the equation $$C_x = \frac{|V_z - V_l|}{V_h - V_l},$$

wherein $V_z$ represents a zero state metric, $V_l$ represents a low state metric, and $V_h$ represents a high state metric.

14. The invention of claim 13, wherein the shared channel is a High-Speed Shared Control Channel (HS-SCCH).

15. The invention of claim 13, wherein:

the message comprises a first part and a second part;

the codeword is encoded in the first part;

if the post-decoding block does not determine that the message is not intended for the communications device, then the second part of the message is decoded.

16. The invention of claim 15, wherein the second part of the message encodes data for demodulating another shared channel.

\* \* \* \* \*